(12) United States Patent
Zhang et al.

(10) Patent No.: US 10,194,353 B2
(45) Date of Patent: Jan. 29, 2019

(54) DATA TRANSMISSION METHOD AND APPARATUS

(71) Applicant: Huawei Technologies Co., Ltd., Shenzhen (CN)

(72) Inventors: Dandan Zhang, Shenzhen (CN); Yu Wang, Shenzhen (CN); Jinhua Miao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 15/435,536

(22) Filed: Feb. 17, 2017

(65) Prior Publication Data
US 2017/0164242 A1 Jun. 8, 2017

Related U.S. Application Data (63) Continuation of application No. PCT/CN2014/084729, filed on Aug. 19, 2014.

(51) Int. Cl.
*H04W 28/26* (2009.01)
*H04W 72/04* (2009.01)
*H04L 5/00* (2006.01)
*H04W 72/12* (2009.01)

(52) U.S. Cl.
CPC ............ *H04W 28/26* (2013.01); *H04L 5/006* (2013.01); *H04L 5/0044* (2013.01); *H04L 5/0094* (2013.01); *H04W 72/042* (2013.01); *H04W 72/044* (2013.01); *H04W 72/1289* (2013.01); *H04L 5/0087* (2013.01); *H04W 72/1268* (2013.01)

(58) Field of Classification Search
CPC ............ H04W 72/042; H04W 72/044; H04W 72/0446; H04W 72/0413; H04L 5/001; H04L 5/0055
See application file for complete search history.

(56) References Cited

U.S. PATENT DOCUMENTS

| | | | |
|---|---|---|---|
| 2009/0092086 A1 | 4/2009 | Lee et al. | |
| 2010/0322086 A1 | 12/2010 | Harris et al. | |
| 2011/0216722 A1* | 9/2011 | Yang | H04L 1/0041 370/329 |
| 2012/0044877 A1 | 2/2012 | Ratasuk et al. | |
| 2012/0300751 A1* | 11/2012 | Arai | H04L 5/0053 370/336 |

(Continued)

FOREIGN PATENT DOCUMENTS

| | | |
|---|---|---|
| CN | 101018362 A | 8/2007 |
| CN | 101272602 A | 9/2008 |

(Continued)

OTHER PUBLICATIONS

Ericsson et al., "Contention based uplink transmissions," 3GPP TSG-RAN WG2 # 66bis R2-093812, Los Angeles, USA, Jun. 29-Jul. 3, 2009, 5 pages.

*Primary Examiner* — Jamal Javaid
(74) *Attorney, Agent, or Firm* — Slater Matsil, LLP (57) ABSTRACT

Embodiments provide a data transmission method and apparatus. After receiving uplink shared resource information sent by an eNB, the UE can parse the uplink shared resource information to obtain location information, and can transmit uplink data on one of uplink shared resources corresponding to the location information.

21 Claims, 3 Drawing Sheets

(56) References Cited

U.S. PATENT DOCUMENTS

| | | | |
|---|---|---|---|
| 2013/0102320 A1 | 4/2013 | Suzuki et al. | |
| 2013/0155987 A1 | 6/2013 | Lan et al. | |
| 2014/0010184 A1* | 1/2014 | McNamara | H04L 5/0039 |
| | | | 370/329 |
| 2014/0036853 A1* | 2/2014 | Kim | H04W 16/14 |
| | | | 370/329 |
| 2015/0373748 A1* | 12/2015 | Panchal | H04W 76/10 |
| | | | 370/336 |

FOREIGN PATENT DOCUMENTS

| | | |
|---|---|---|
| CN | 102158932 A | 8/2011 |
| CN | 102291826 A | 12/2011 |
| JP | 2011142532 A | 7/2011 |
| JP | 2013539274 A | 10/2013 |
| WO | 2010057540 A1 | 5/2010 |
| WO | 2013020279 A1 | 2/2013 |

* cited by examiner

DATA TRANSMISSION METHOD AND APPARATUS

CROSS-REFERENCE TO RELATED APPLICATIONS

This application is a continuation of International Application No. PCT/CN2014/084729, filed on Aug. 19, 2014, the disclosure of which is hereby incorporated by reference in its entirety.

TECHNICAL FIELD

Embodiments relate to the field of communications technologies, and in particular, to a data transmission method and apparatus.

BACKGROUND

On a Long Term Evolution (LTE) network, a quantity of users increases, and various new applications also gradually emerge. Therefore, a large quantity of data packets need to be transmitted on an uplink. On the LTE network, each time user equipment (UE) transmits uplink data, the UE needs to send an uplink scheduling request (SR for short) to an evolved NodeB (eNB), wait for grant from the eNB on a physical downlink control channel (PDCCH), and after receiving grant on the PDCCH, transmit the uplink data on a physical uplink shared channel (PUSCH).

However, when a large quantity of data packets need to be transmitted on an uplink, PUSCH utilization is not high by using the prior-art method because a PDCCH capacity is limited.

SUMMARY

Embodiments provide a data transmission method and apparatus, to improve PUSCH utilization.

A first aspect of the embodiments provides a data transmission method. The method includes receiving, by user equipment (UE), uplink shared resource information sent by an evolved NodeB (eNB), where the uplink shared resource information includes location information of M uplink shared resources, the M uplink shared resources are uplink shared resources, allocated by the eNB, that the UE is allowed to use without a need to request grant, and M is an integer greater than or equal to 1. The method also includes parsing, by the UE, the uplink shared resource information to obtain the location information. The method also includes transmitting, by the UE, uplink data on one of the uplink shared resources corresponding to the location information.

With reference to the first aspect, in a first possible implementation manner of the first aspect, the transmitting uplink data on one of the uplink shared resources corresponding to the location information includes: determining, by the UE from the M uplink shared resources, one to-be-used uplink shared resource in an idle state; and transmitting, by the UE, the uplink data on the to-be-used uplink shared resource.

With reference to the first possible implementation manner of the first aspect, in a second possible implementation manner, the determining, by the UE from the M uplink shared resources, one to-be-used uplink shared resource in an idle state includes: determining, by the UE according to a status of a channel between the UE and the eNB, one candidate uplink shared resource from the M uplink shared resources; and determining, by the UE, the candidate uplink shared resource as the to-be-used uplink shared resource when the candidate uplink shared resource is in an idle state.

With reference to the second possible implementation manner of the first aspect, in a third possible implementation manner, the uplink shared resource information further includes modulation and coding schemes MCSs respectively corresponding to the M uplink shared resources; and the determining, by the UE according to a status of a channel between the UE and the eNB, one candidate uplink shared resource from the M uplink shared resources includes: determining, by the UE from the M uplink shared resources, one candidate uplink shared resource according to the status of the channel between the UE and the eNB and according to the MCSs of the M uplink shared resources.

With reference to the second possible implementation manner or the third possible implementation manner of the first aspect, in a fourth possible implementation manner, the M uplink shared resources are in a one-to-one correspondence with M physical reservation indication channel PRICHs, and the PRICHs are used to indicate whether the uplink shared resources corresponding to the PRICHs are in an idle state; and the determining, by the UE, the candidate uplink shared resource as the to-be-used uplink shared resource when the candidate uplink shared resource is in an idle state includes: determining, by the UE according to a PRICH corresponding to the candidate uplink shared resource, whether the candidate uplink shared resource is in an idle state; and determining the candidate uplink shared resource as the to-be-used uplink shared resource when the candidate uplink shared resource is in an idle state.

With reference to the fourth possible implementation manner of the first aspect, in a fifth possible implementation manner, the determining the candidate uplink shared resource as the to-be-used uplink shared resource when the candidate uplink shared resource is in an idle state includes: sending, by the UE, a resource reservation request on the candidate uplink shared resource to the eNB when the candidate uplink shared resource is in an idle state, where the resource reservation request is used to request the eNB to reserve the candidate uplink shared resource for the UE; receiving, by the UE, a resource reservation response sent by the eNB, where the resource reservation response is used to indicate whether the candidate uplink shared resource requested by the UE for reservation is successfully reserved; and determining the candidate uplink shared resource as the to-be-used uplink shared resource if the resource reservation response indicates that the candidate uplink shared resource is successfully reserved.

With reference to the fifth possible implementation manner of the first aspect, in a sixth possible implementation manner, the resource reservation response is carried on the PRICHs, and the PRICHs are further used to indicate whether the candidate uplink shared resource requested by the UE for reservation is successfully reserved.

With reference to any one of the fourth to the sixth possible implementation manners of the first aspect, in a seventh possible implementation manner, the transmitting, by the UE, the uplink data on the to-be-used uplink shared resource includes: if a volume of to-be-transmitted uplink data of the UE is greater than a maximum volume of data that is allowed to be transmitted on the to-be-used uplink shared resource, transmitting, by the UE, the uplink data on the to-be-used uplink shared resource, where the uplink data includes the resource reservation request.

With reference to any one of the first aspect or the first to the seventh possible implementation manners of the first aspect, in an eighth possible implementation manner, after the transmitting, by the UE, the uplink data on the to-be-used uplink shared resource, the method further includes: receiving, by the UE, uplink data feedback information sent by the eNB, where the uplink data feedback information is used to notify the UE whether the eNB successfully receives the uplink data; determining, by the UE, a packet error rate of the uplink data according to the uplink data feedback information; and when the packet error rate is greater than a preset threshold, re-determining, by the UE, a to-be-used uplink shared resource to transmit the uplink data, or sending, by the UE, a scheduling request SR to the eNB to request a dedicated transmission resource to transmit the uplink data.

With reference to any one of the first aspect or the first to the eighth possible implementation manners of the first aspect, in a ninth possible implementation manner, the method further includes: receiving, by the UE, uplink shared resource update information sent by the eNB, where the uplink shared resource update information is used to update the location information of the uplink shared resources; and re-determining, by the UE, a to-be-used uplink shared resource according to the uplink shared resource update information.

With reference to any one of the first aspect or the first to the ninth possible implementation manners of the first aspect, in a tenth possible implementation manner, the receiving, by UE, uplink shared resource information sent by an eNB includes: receiving, by the UE by using physical layer signaling, the uplink shared resource information sent by the eNB, where the physical layer signaling is scrambled by using a shared RNTI; and the parsing, by the UE, the uplink shared resource information to obtain the location information includes: descrambling, by the UE, the physical layer signaling by using the shared RNTI to obtain the uplink shared resource information; and parsing, by the UE, the uplink shared resource information to obtain the location information.

With reference to the tenth possible implementation manner of the first aspect, in an eleventh possible implementation manner, before the descrambling, by the UE, the uplink shared resource information by using the shared RNTI, the method further includes: receiving, by the UE, the shared RNTI sent by the eNB.

With reference to any one of the first aspect or the first to the ninth possible implementation manners of the first aspect, in a twelfth possible implementation manner, the receiving, by UE, uplink shared resource information sent by an eNB includes: receiving, by the UE by using dedicated Radio Resource Control RRC protocol signaling, the uplink shared resource information sent by the eNB.

With reference to any one of the first aspect or the first to the ninth possible implementation manners of the first aspect, in a thirteenth possible implementation manner, the receiving, by UE, uplink shared resource information sent by an eNB includes: receiving, by the UE by using a system broadcast message, the uplink shared resource information sent by the eNB.

With reference to any one of the first aspect or the first to the ninth possible implementation manners of the first aspect, in a fourteenth possible implementation manner, the receiving, by UE, uplink shared resource information sent by an eNB includes: receiving, by the UE by using a Msg4 message, the uplink shared resource information sent by the eNB.

A second aspect of the embodiments provides a data transmission method. The method includes allocating, by an evolved NodeB eNB, M uplink shared resources to at least one user equipment UE, where the M uplink shared resources are uplink shared resources, allocated by the eNB, that the at least one UE is allowed to use without a need to request grant, and M is an integer greater than or equal to 1. The method also includes sending, by the eNB, uplink shared resource information to the at least one UE, where the uplink shared resource information includes location information of the M uplink shared resources.

With reference to the second aspect, in a first possible implementation manner of the second aspect, the M uplink shared resources are in a one-to-one correspondence with M physical reservation indication channel PRICHs, and the PRICH is used to indicate whether a shared resource corresponding to the PRICH is in an idle state; and after the sending, by the eNB, uplink shared resource information to the at least one UE, the method further includes: sending, by the eNB, resource information of the M PRICHs to the at least one UE.

With reference to the second aspect or the first possible implementation manner of the second aspect, in a second possible implementation manner of the second aspect, the method further includes: receiving, by the eNB, a resource reservation request sent by first UE in the at least one UE, where the resource reservation request is used to request the eNB to reserve, for the first UE, an uplink shared resource requested by the first UE for reservation; and sending, by the eNB, a resource reservation response to the first UE according to whether the uplink shared resource requested by the first UE for reservation is in an idle state, where the resource reservation response is used to indicate whether the uplink shared resource requested by the first UE for reservation is successfully reserved.

With reference to the second possible implementation manner of the second aspect, in a third possible implementation manner, the resource reservation response is carried on the PRICHs, and the PRICHs are further used to indicate whether the candidate uplink shared resource requested by the UE for reservation is successfully reserved.

With reference to any one of the second aspect or the first to the third possible implementation manners of the second aspect, in a fourth possible implementation manner, the method further includes: sending, by the eNB, uplink shared resource update information to the at least one UE.

With reference to any one of the second aspect or the first to the third possible implementation manners of the second aspect, in a fifth possible implementation manner, the sending, by the eNB, uplink shared resource information to the at least one UE includes: scrambling, by the eNB, physical layer signaling by using a shared RNTI; and sending, by the eNB, the uplink shared resource information to the at least one UE by using the physical layer signaling.

With reference to the fifth possible implementation manner of the second aspect, in a sixth possible implementation manner, before the scrambling, by the eNB, the uplink shared resource information by using a shared RNTI, the method further includes: sending, by the eNB, the shared RNTI to the at least one UE.

With reference to any one of the second aspect or the first to the third possible implementation manners of the second aspect, in a seventh possible implementation manner, the sending, by the eNB, uplink shared resource information to the at least one UE includes: sending, by the eNB by using dedicated Radio Resource Control RRC protocol signaling, the uplink shared resource information to the at least one UE.

With reference to any one of the second aspect or the first to the third possible implementation manners of the second aspect, in an eighth possible implementation manner, the sending, by the eNB, uplink shared resource information to the at least one UE includes: sending, by the eNB, the uplink shared resource information to the at least one UE by using a Msg4 message.

A third aspect of the embodiments provides a data transmission apparatus, where the data transmission apparatus is user equipment UE. The UE includes a receiving module, configured to receive uplink shared resource information sent by an evolved NodeB eNB, where the uplink shared resource information includes location information of M uplink shared resources, the M uplink shared resources are uplink shared resources, allocated by the eNB, that the UE is allowed to use without a need to request grant, and M is an integer greater than or equal to 1. The UE also includes a parsing module, configured to parse the uplink shared resource information to obtain the location information. The UE also includes a sending module, configured to transmit uplink data on one of the uplink shared resources corresponding to the location information.

With reference to the third aspect, in a first possible implementation manner of the third aspect, the sending module is specifically configured to: determine one to-be-used uplink shared resource in an idle state from the M uplink shared resources, and transmit the uplink data on the to-be-used uplink shared resource.

With reference to the first possible implementation manner of the third aspect, in a second possible implementation manner, the sending module is specifically configured to: determine one candidate uplink shared resource from the M uplink shared resources according to a status of a channel between the UE and the eNB, and determine the candidate uplink shared resource as the to-be-used uplink shared resource when the candidate uplink shared resource is in an idle state.

With reference to the second possible implementation manner of the third aspect, in a third possible implementation manner, the uplink shared resource information further includes modulation and coding schemes MCSs respectively corresponding to the M uplink shared resources. The sending module is specifically configured to determine one candidate uplink shared resource from the M uplink shared resources according to the status of the channel between the UE and the eNB and according to the MCSs of the M uplink shared resources.

With reference to the second possible implementation manner or the third possible implementation manner of the third aspect, in a fourth possible implementation manner, the M uplink shared resources are in a one-to-one correspondence with M physical reservation indication channel PRICHs, and the PRICHs are used to indicate whether the uplink shared resources corresponding to the PRICHs are in an idle state. The sending module is specifically configured to: determine, according to a PRICH corresponding to the candidate uplink shared resource, whether the candidate uplink shared resource is in an idle state; and determine the candidate uplink shared resource as the to-be-used uplink shared resource when the candidate uplink shared resource is in an idle state.

With reference to the fourth possible implementation manner of the third aspect, in a fifth possible implementation manner, the sending module is specifically configured to: send a resource reservation request on the candidate uplink shared resource to the eNB when the candidate uplink shared resource is in an idle state, where the resource reservation request is used to request the eNB to reserve the candidate uplink shared resource for the UE; receive a resource reservation response sent by the eNB, where the resource reservation response is used to indicate whether the candidate uplink shared resource requested by the UE for reservation is successfully reserved; and determine the candidate uplink shared resource as the to-be-used uplink shared resource if the resource reservation response indicates that the candidate uplink shared resource is successfully reserved.

With reference to the fifth possible implementation manner of the third aspect, in a sixth possible implementation manner, the resource reservation response is carried on the PRICHs, and the PRICHs are further used to indicate whether the candidate uplink shared resource requested by the UE for reservation is successfully reserved.

With reference to any one of the fourth to the sixth possible implementation manners of the third aspect, in a seventh possible implementation manner, the sending module is specifically configured to: if a volume of to-be-transmitted uplink data of the UE is greater than a maximum volume of data that is allowed to be transmitted on the to-be-used uplink shared resource, transmit the uplink data on the to-be-used uplink shared resource, where the uplink data includes the resource reservation request.

With reference to any one of the third aspect or the first to the seventh possible implementation manners of the third aspect, in an eighth possible implementation manner, the receiving module is further configured to: after the sending module transmits the uplink data on the to-be-used uplink shared resource, receive uplink data feedback information sent by the eNB, where the uplink data feedback information is used to notify the UE whether the eNB successfully receives the uplink data; and determine a packet error rate of the uplink data according to the uplink data feedback information. The sending module is further configured to: when the packet error rate is greater than a preset threshold, re-determine a to-be-used uplink shared resource to transmit the uplink data, or send a scheduling request SR to the eNB to request a dedicated transmission resource to transmit the uplink data.

With reference to any one of the third aspect or the first to the eighth possible implementation manners of the third aspect, in a ninth possible implementation manner, the receiving module is further configured to: receive uplink shared resource update information sent by the eNB, where the uplink shared resource update information is used to update the location information of the uplink shared resources; and re-determine a to-be-used uplink shared resource according to the uplink shared resource update information.

With reference to any one of the third aspect or the first to the ninth possible implementation manners of the third aspect, in a tenth possible implementation manner, the receiving module is specifically configured to: receive, by using physical layer signaling, the uplink shared resource information sent by the eNB, where the physical layer signaling is scrambled by using a shared RNTI. The parsing module is specifically configured to: descramble the physical layer signaling by using the shared RNTI to obtain the uplink shared resource information; and parse the uplink shared resource information to obtain the location information.

With reference to the tenth possible implementation manner of the third aspect, in an eleventh possible implementation manner, the receiving module is further configured to: before the parsing module descrambles the uplink shared resource information by using the shared RNTI, receive the shared RNTI sent by the eNB.

With reference to any one of the third aspect or the first to the ninth possible implementation manners of the third aspect, in a twelfth possible implementation manner, the receiving module is specifically configured to receive, by using dedicated Radio Resource Control RRC protocol signaling, the uplink shared resource information sent by the eNB.

With reference to any one of the third aspect or the first to the ninth possible implementation manners of the third aspect, in a thirteenth possible implementation manner, the receiving module is specifically configured to receive, by using a system broadcast message, the uplink shared resource information sent by the eNB.

With reference to any one of the third aspect or the first to the ninth possible implementation manners of the third aspect, in a fourteenth possible implementation manner, the receiving module is specifically configured to receive, by using a Msg4 message, the uplink shared resource information sent by the eNB.

A fourth aspect of the embodiments provides a data transmission apparatus, where the data transmission apparatus is an evolved NodeB (eNB). The apparatus includes an allocating module, configured to allocate M uplink shared resources to at least one user equipment UE, where the M uplink shared resources are uplink shared resources, allocated by the eNB, that the at least one UE is allowed to use without a need to request grant, and M is an integer greater than or equal to 1. The apparatus also includes a sending module, configured to send uplink shared resource information to the at least one UE, where the uplink shared resource information includes location information of the M uplink shared resources.

With reference to the fourth aspect, in a first possible implementation manner of the fourth aspect, the M uplink shared resources are in a one-to-one correspondence with M physical reservation indication channel PRICHs, and the PRICH is used to indicate whether a shared resource corresponding to the PRICH is in an idle state. The sending module is further configured to send resource information of the M PRICHs to the at least one UE after sending the uplink shared resource information to the at least one UE.

With reference to the fourth aspect or the first possible implementation manner of the fourth aspect, in a second possible implementation manner of the fourth aspect, the apparatus further includes: a receiving module, configured to receive a resource reservation request sent by first UE in the at least one UE, where the resource reservation request is used to request the eNB to reserve, for the first UE, an uplink shared resource requested by the first UE for reservation. The sending module is further configured to send a resource reservation response to the first UE according to whether the uplink shared resource requested by the first UE for reservation is in an idle state, where the resource reservation response is used to indicate whether the uplink shared resource requested by the first UE for reservation is successfully reserved.

With reference to the second possible implementation manner of the fourth aspect, in a third possible implementation manner, the resource reservation response is carried on the PRICHs, and the PRICHs are further used to indicate whether the candidate uplink shared resource requested by the UE for reservation is successfully reserved.

With reference to any one of the fourth aspect or the first to the third possible implementation manners of the fourth aspect, in a fourth possible implementation manner, the sending module is further configured to send uplink shared resource update information to the at least one UE.

With reference to any one of the fourth aspect or the first to the third possible implementation manners of the fourth aspect, in a fifth possible implementation manner, the sending module is specifically configured to: scramble physical layer signaling by using a shared RNTI; and send the uplink shared resource information to the at least one UE by using the physical layer signaling.

With reference to the fifth possible implementation manner of the fourth aspect, in a sixth possible implementation manner, the sending module is further configured to send the shared RNTI to the at least one UE before scrambling the uplink shared resource information by using the shared RNTI.

With reference to any one of the fourth aspect or the first to the third possible implementation manners of the fourth aspect, in a seventh possible implementation manner, the sending module is specifically configured to send the uplink shared resource information to the at least one UE by using dedicated Radio Resource Control RRC protocol signaling.

With reference to any one of the fourth aspect or the first to the third possible implementation manners of the fourth aspect, in an eighth possible implementation manner, the sending module is specifically configured to send the uplink shared resource information to the at least one UE by using a Msg4 message.

A fifth aspect of the embodiments provides a data transmission apparatus, where the data transmission apparatus is user equipment UE. The apparatus includes a receiver, configured to receive uplink shared resource information sent by an evolved NodeB eNB, where the uplink shared resource information includes location information of M uplink shared resources, the M uplink shared resources are uplink shared resources, allocated by the eNB, that the UE is allowed to use without a need to request grant, and M is an integer greater than or equal to 1. The apparatus also includes a parser, configured to parse the uplink shared resource information to obtain the location information. The apparatus also includes a transmitter, configured to transmit uplink data on one of the uplink shared resources corresponding to the location information.

With reference to the fifth aspect, in a first possible implementation manner of the fifth aspect, the transmitter is specifically configured to: determine one to-be-used uplink shared resource in an idle state from the M uplink shared resources, and transmit the uplink data on the to-be-used uplink shared resource.

With reference to the first possible implementation manner of the fifth aspect, in a second possible implementation manner, the transmitter is specifically configured to: determine one candidate uplink shared resource from the M uplink shared resources according to a status of a channel between the UE and the eNB, and determine the candidate uplink shared resource as the to-be-used uplink shared resource when the candidate uplink shared resource is in an idle state.

With reference to the second possible implementation manner of the fifth aspect, in a third possible implementation manner, the uplink shared resource information further includes modulation and coding schemes MCSs respectively corresponding to the M uplink shared resources. The transmitter is specifically configured to determine one candidate uplink shared resource from the M uplink shared resources according to the status of the channel between the UE and the eNB and according to the MCSs of the M uplink shared resources.

With reference to the second possible implementation manner or the third possible implementation manner of the fifth aspect, in a fourth possible implementation manner, the M uplink shared resources are in a one-to-one correspondence with M physical reservation indication channel PRICHs, and the PRICHs are used to indicate whether the uplink shared resources corresponding to the PRICHs are in an idle state. The transmitter is specifically configured to: determine, according to a PRICH corresponding to the candidate uplink shared resource, whether the candidate uplink shared resource is in an idle state; and determine the candidate uplink shared resource as the to-be-used uplink shared resource when the candidate uplink shared resource is in an idle state.

With reference to the fourth possible implementation manner of the fifth aspect, in a fifth possible implementation manner, the transmitter is specifically configured to: send a resource reservation request on the candidate uplink shared resource to the eNB when the candidate uplink shared resource is in an idle state, where the resource reservation request is used to request the eNB to reserve the candidate uplink shared resource for the UE; receive a resource reservation response sent by the eNB, where the resource reservation response is used to indicate whether the candidate uplink shared resource requested by the UE for reservation is successfully reserved; and determine the candidate uplink shared resource as the to-be-used uplink shared resource if the resource reservation response indicates that the candidate uplink shared resource is successfully reserved.

With reference to the fifth possible implementation manner of the fifth aspect, in a sixth possible implementation manner, the resource reservation response is carried on the PRICHs, and the PRICHs are further used to indicate whether the candidate uplink shared resource requested by the UE for reservation is successfully reserved.

With reference to any one of the fourth to the sixth possible implementation manners of the fifth aspect, in a seventh possible implementation manner, the transmitter is specifically configured to: if a volume of to-be-transmitted uplink data of the UE is greater than a maximum volume of data that is allowed to be transmitted on the to-be-used uplink shared resource, transmit the uplink data on the to-be-used uplink shared resource, where the uplink data includes the resource reservation request.

With reference to any one of the fifth aspect or the first to the seventh possible implementation manners of the fifth aspect, in an eighth possible implementation manner, the receiver is further configured to: after the transmitter transmits the uplink data on the to-be-used uplink shared resource, receive uplink data feedback information sent by the eNB, where the uplink data feedback information is used to notify the UE whether the eNB successfully receives the uplink data; and determine a packet error rate of the uplink data according to the uplink data feedback information. The transmitter is further configured to: when the packet error rate is greater than a preset threshold, re-determine a to-be-used uplink shared resource to transmit the uplink data, or send a scheduling request SR to the eNB to request a dedicated transmission resource to transmit the uplink data.

With reference to any one of the fifth aspect or the first to the eighth possible implementation manners of the fifth aspect, in a ninth possible implementation manner, the receiver is further configured to: receive uplink shared resource update information sent by the eNB, where the uplink shared resource update information is used to update the location information of the uplink shared resources; and re-determine a to-be-used uplink shared resource according to the uplink shared resource update information.

With reference to any one of the fifth aspect or the first to the ninth possible implementation manners of the fifth aspect, in a tenth possible implementation manner, the receiver is specifically configured to: receive, by using physical layer signaling, the uplink shared resource information sent by the eNB, where the physical layer signaling is scrambled by using a shared RNTI. The parser is specifically configured to: descramble the physical layer signaling by using the shared RNTI to obtain the uplink shared resource information; and parse the uplink shared resource information to obtain the location information.

With reference to the tenth possible implementation manner of the fifth aspect, in an eleventh possible implementation manner, the receiver is further configured to: before the parser descrambles the uplink shared resource information by using the shared RNTI, receive the shared RNTI sent by the eNB.

With reference to any one of the fifth aspect or the first to the ninth possible implementation manners of the fifth aspect, in a twelfth possible implementation manner, the receiver is specifically configured to receive, by using dedicated Radio Resource Control RRC protocol signaling, the uplink shared resource information sent by the eNB.

With reference to any one of the fifth aspect or the first to the ninth possible implementation manners of the fifth aspect, in a thirteenth possible implementation manner, the receiver is specifically configured to receive, by using a system broadcast message, the uplink shared resource information sent by the eNB.

With reference to any one of the fifth aspect or the first to the ninth possible implementation manners of the fifth aspect, in a fourteenth possible implementation manner, the receiver is specifically configured to receive, by using a Msg4 message, the uplink shared resource information sent by the eNB.

A sixth aspect of the embodiments provides a data transmission apparatus, where the data transmission apparatus is an evolved NodeB (eNB). The apparatus also includes a processor, configured to allocate M uplink shared resources to at least one user equipment UE, where the M uplink shared resources are uplink shared resources, allocated by the eNB, that the at least one UE is allowed to use without a need to request grant, and M is an integer greater than or equal to 1. The apparatus also includes a transmitter, configured to send uplink shared resource information to the at least one UE, where the uplink shared resource information includes location information of the M uplink shared resources.

With reference to the sixth aspect, in a first possible implementation manner of the sixth aspect, the M uplink shared resources are in a one-to-one correspondence with M physical reservation indication channel PRICHs, and the PRICH is used to indicate whether a shared resource corresponding to the PRICH is in an idle state. The transmitter is further configured to send resource information of the M PRICHs to the at least one UE after sending the uplink shared resource information to the at least one UE.

With reference to the sixth aspect or the first possible implementation manner of the sixth aspect, in a second possible implementation manner of the sixth aspect, the apparatus further includes a receiver, configured to receive a resource reservation request sent by first UE in the at least one UE, where the resource reservation request is used to request the eNB to reserve, for the first UE, an uplink shared resource requested by the first UE for reservation. The transmitter is further configured to send a resource reservation response to the first UE according to whether the uplink shared resource requested by the first UE for reservation is in an idle state, where the resource reservation response is used to indicate whether the uplink shared resource requested by the first UE for reservation is successfully reserved.

With reference to the second possible implementation manner of the sixth aspect, in a third possible implementation manner, the resource reservation response is carried on the PRICHs, and the PRICHs are further used to indicate whether the candidate uplink shared resource requested by the UE for reservation is successfully reserved.

With reference to any one of the sixth aspect or the first to the third possible implementation manners of the sixth aspect, in a fourth possible implementation manner, the transmitter is further configured to send uplink shared resource update information to the at least one UE.

With reference to any one of the sixth aspect or the first to the third possible implementation manners of the sixth aspect, in a fifth possible implementation manner, the transmitter is specifically configured to: scramble physical layer signaling by using a shared RNTI; and send the uplink shared resource information to the at least one UE by using the physical layer signaling.

With reference to the fifth possible implementation manner of the sixth aspect, in a sixth possible implementation manner, the transmitter is further configured to send the shared RNTI to the at least one UE before scrambling the uplink shared resource information by using the shared RNTI.

With reference to any one of the sixth aspect or the first to the third possible implementation manners of the sixth aspect, in a seventh possible implementation manner, the transmitter is specifically configured to send the uplink shared resource information to the at least one UE by using dedicated Radio Resource Control RRC protocol signaling.

With reference to any one of the sixth aspect or the first to the third possible implementation manners of the sixth aspect, in an eighth possible implementation manner, the transmitter is specifically configured to send the uplink shared resource information to the at least one UE by using a Msg4 message.

According to the data transmission method and apparatus provided in the embodiments, UE receives uplink shared resource information sent by an eNB. The uplink shared information includes location information of M uplink shared resources, and the M uplink shared resources are uplink shared resources, allocated by the eNB, that the UE is allowed to use without a need to request grant. Therefore, the UE can parse the uplink shared resource information to obtain the location information, and can transmit the uplink data on one of the uplink shared resources corresponding to the location information. A limited PDCCH capacity does not impose restrictions, thereby improving PUSCH utilization.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In the existing LTE, when transmitting uplink data, UE needs to send an SR to an eNB, and then waits for grant on a PDCCH. The UE can transmit the uplink data on a PUSCH only after receiving grant. When a connection quantity is relatively large, a PDCCH capacity is limited, and consequently, PUSCH utilization is not high. To resolve the foregoing problem, in the present invention, an eNB pre-allocates some uplink shared resources for UE within a preset area. These uplink shared resources can be used in a "PDCCH less" manner. This specifically means that the UE within a preset area can use, without a need to request grant, these uplink shared resources that are pre-allocated by the eNB. Because the uplink shared resources can be used without a need to request grant, restriction on waiting for grant on a PDCCH is removed. This saves PDCCH resources and thereby improves PUSCH utilization.

The following describes the technical solutions of the present invention in detail by using specific embodiments. The following specific embodiments may be combined, and the same or similar concepts or processes may be not repeated in some embodiments.

Figure 1:
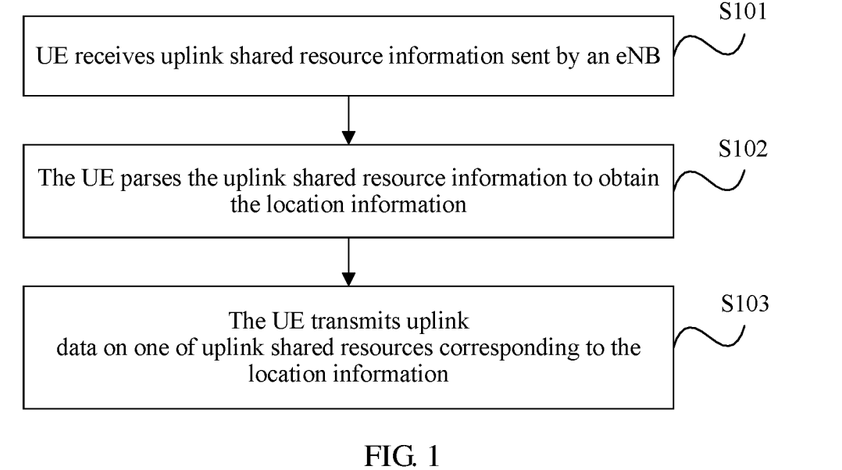
FIG. 1 is a schematic flowchart of Embodiment 1 of a data transmission method.

FIG. 1 is a schematic flowchart of Embodiment 1 of a data transmission method. This embodiment is executed by UE. As shown in FIG. 1, the method in this embodiment includes the following steps.

S101: The UE receives uplink shared resource information sent by an eNB.

The eNB allocates M uplink shared resources to at least one UE. The M uplink shared resources are uplink shared resources, allocated by the eNB, that the at least one UE is allowed to use without a need to request grant, and M is an integer greater than or equal to 1. The at least one UE refers to UE within a preset area. Before allocating the M uplink shared resources to the at least one UE, the eNB determines the UE within a preset area according to a preset rule and according to information fed back by the UE, such as a service type, and then allocates the M uplink shared resources to the UE within a preset area, so that the UE within a preset area can use the M uplink shared resources without a need to request grant.

After allocating the M uplink shared resources to the at least one UE, the eNB sends the uplink shared resource information to the at least one UE. The uplink shared resource information includes location information of the M uplink shared resources, so that the UE determines, according to the location information, which uplink shared resources can be used without a need to request grant. The location information includes information such as a time-frequency resource.

Correspondingly, the UE receives the uplink shared resource information sent by the eNB.

S102: The UE parses the uplink shared resource information to obtain the location information.

After receiving the uplink shared information, the UE parses the uplink shared information to obtain the location information of the M uplink shared resources.

S103: The UE transmits uplink data on one of the uplink shared resources corresponding to the location information.

When the UE needs to transmit uplink data, the UE can perform transmission on one of the uplink shared resources corresponding to the obtained location information of the M uplink shared resources, and does not need to go through a process of requesting grant.

In this embodiment, UE receives uplink shared resource information sent by an eNB. The uplink shared information includes location information of M uplink shared resources, and the M uplink shared resources are uplink shared resources, allocated by the eNB, that the UE is allowed to use without a need to request grant. Therefore, the UE can parse the uplink shared resource information to obtain the location information, and can transmit uplink data on one of the uplink shared resources corresponding to the location information. A limited PDCCH capacity does not impose restrictions, thereby improving PUSCH utilization.

Figure 2:
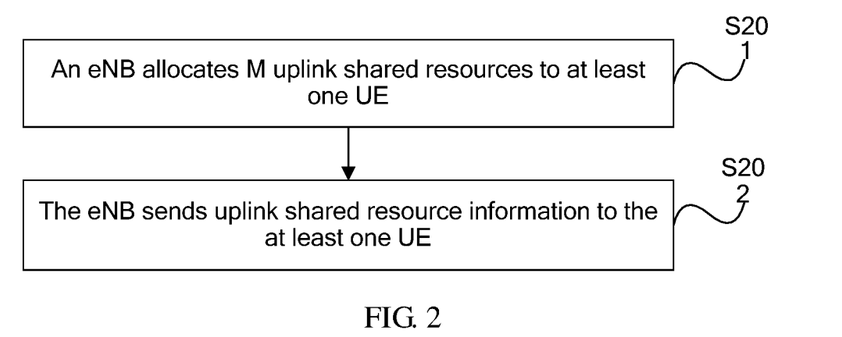
FIG. 2 is a schematic flowchart of Embodiment 2 of a data transmission method.

FIG. 2 is a schematic flowchart of Embodiment 2 of a data transmission method. This embodiment is executed by an eNB. As shown in FIG. 2, the method in this embodiment includes the following steps.

S201: The eNB allocates M uplink shared resources to at least one UE.

The M uplink shared resources are uplink shared resources, allocated by the eNB, that the at least one UE is allowed to use without a need to request grant, and M is an integer greater than or equal to 1.

S202: The eNB sends uplink shared resource information to the at least one UE.

The uplink shared resource information includes location information of the M uplink shared resources. The location information includes information such as a time-frequency resource.

For detailed description of S201 and S202, refer to the description of S101 shown in FIG. 1. Details are not described herein again.

In this embodiment, an eNB allocates M uplink shared resources to at least one UE, and the eNB sends uplink shared resource information to the at least one UE. The M uplink shared resources are uplink shared resources, allocated by the eNB, that the at least one UE is allowed to use without a need to request grant. Therefore, the UE can transmit uplink data on one of the M uplink shared resources. A limited PDCCH capacity does not impose restrictions, thereby improving PUSCH utilization.

In the foregoing embodiments, manners for sending the uplink shared resource information by the eNB to the at least one UE include but are not limited to the following four manners.

Implementation manner 1: The eNB sends the uplink shared resource information to the at least one UE by using physical layer signaling. The eNB scrambles the physical layer signaling by using a shared radio network temporary identifier (RNTI for short), for example, performing scrambling by using a PDCCH-RNTI (PDCCH Less RNTI, PL-RNTI for short). Before the eNB uses the shared RNTI to scramble the physical layer signaling, the eNB sends the shared RNTI to the at least one UE, that is, the at least one UE has a same shared RNTI. The shared RNTI is different from an existing shared RNTI.

The physical layer signaling may be a DCI message.

Correspondingly, the UE receives, by using the physical layer signaling, the uplink shared resource information sent by the eNB. The physical layer signaling is scrambled by using the shared RNTI. The UE descrambles the received physical layer signaling by using the shared RNTI to obtain the uplink shared resources information. Before descrambling, the UE receives the shared RNTI sent by the eNB. Specifically, the eNB may send the RNTI to the UE by using dedicated signaling, and only UE that has a same shared RNTI that is used by the eNB for scrambling can successfully perform descrambling. Only the UE that successfully performs descrambling can use, without a need to request grant, the M uplink shared resources included in the uplink shared resource information.

Implementation manner 2: The eNB sends the uplink shared resource information to the at least one UE by using dedicated Radio Resource Control RRC protocol signaling.

Correspondingly, the UE receives, by using the dedicated RRC signaling, the uplink shared resource information sent by the eNB.

Implementation manner 3: The eNB sends the uplink shared resource information to the at least one UE by using a system broadcast message.

Correspondingly, the UE receives, by using the system broadcast message, the uplink shared resource information sent by the eNB.

Fourth implementation manner: The eNB sends the uplink shared resource information to the at least one UE by using a Msg4 message.

Correspondingly, the UE receives, by using the Msg4 message, the uplink shared resource information sent by the eNB.

The foregoing four implementation manners are only used as examples for description, and do not impose limitations on a specific implementation manner of the present invention.

In the foregoing embodiments, when there are two UEs within a preset area, after the UE receives the uplink shared resource information sent by the eNB, and when the UE transmits uplink data, the UE may use the M uplink shared resources allocated by the eNB in the following several manners. Specifically, the manners include but are not limited to the following several manners.

Figure 3:
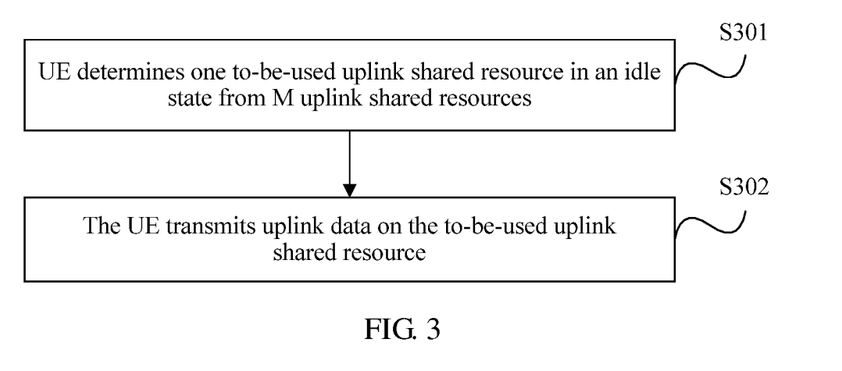
FIG. 3 is a schematic flowchart of Embodiment 3 of a data transmission method.

A first implementation manner includes the following steps. As shown in FIG. 3, FIG. 3 is a schematic flowchart of Embodiment 3 of a data transmission method.

S301: UE determines one to-be-used uplink shared resource in an idle state from M uplink shared resources.

Specifically, the UE determines one candidate uplink shared resource from the M uplink shared resources according to a status of a channel between the UE and the eNB, or randomly determines one candidate uplink shared resource from the M uplink shared resources. The UE determines the candidate uplink shared resource as the to-be-used uplink shared resource when the candidate uplink shared resource is in an idle state.

In the foregoing embodiment, in the M uplink shared resources allocated by the eNB, each uplink shared resource is corresponding to one modulation and coding scheme (MCS for short). Therefore, the uplink shared resource information may further include transmission-related information, such as an MCS. The MCSs of the M shared resources may be the same or may be different according to different positions of the UE. This is not limited in the present invention.

The determining one candidate uplink shared resource from the M uplink shared resources may be specifically: determining, according to the MCSs of the M uplink shared resources and from the M uplink shared resources, that one uplink shared resource suitable for the UE is used as the candidate uplink shared resource. Specifically, the UE may perform selection from the M uplink shared resources according to the status of the channel between the UE and the eNB and according to the modulation and coding schemes of the M shared resources. When a channel status for the UE is relatively good, that is, a measurement result is greater than a first preset threshold, the UE may select a shared resource with a relatively high modulation and coding scheme. When a channel status for the UE is relatively poor, that is, a measurement result is less than a second preset threshold, the UE may select a shared resource with a relatively low modulation and coding scheme. The channel status may be a result of a pilot signal measured by the UE. The first preset threshold and the second preset threshold are configured for the UE by using higher layer signaling.

After the candidate uplink shared resource is determined, whether the candidate uplink shared resource is in an idle state needs to be further determined. Specifically, the M uplink shared resources are in a one-to-one correspondence with M physical reservation indication channels (PRICH for short), and the PRICHs are used to indicate whether the uplink shared resources corresponding to the PRICHs are in an idle state. After sending the uplink shared information to the at least one UE, the eNB further sends the M PRICHs to the at least one UE, so that the UE determines, according to a PRICH, whether a corresponding uplink shared resource is in an idle state. For example, when the PRICH is 1, it indicates that an uplink shared channel corresponding to the PRICH is in an occupied state; or when the PRICH is 0, it indicates that an uplink shared channel corresponding to the PRICH is in an idle state. Therefore, the UE may determine, according to a PRICH corresponding to the candidate uplink shared channel, whether the candidate uplink shared resource is in an idle state. When the candidate uplink shared resource is in an idle state, the UE determines the candidate uplink shared resource as the to-be-used uplink shared resource. When the candidate uplink shared resource is in an occupied state, that is, data is being transmitted on a candidate uplink shared channel, the UE backs off for a period of time according to a backoff rule, determines whether the candidate uplink shared resource is in an idle state, and then determines the candidate uplink shared resource as the to-be-used uplink shared resource when the candidate uplink shared resource is in an idle state. When the candidate uplink shared resource is in an occupied state, the UE may re-select a suboptimal uplink shared resource as the candidate uplink shared resource. The present invention is not limited thereto.

Certainly, alternatively, the UE may first determine a candidate uplink shared channel according to whether the M uplink shared resources are in an idle state. For how to determine whether the M uplink shared resources are in an idle state, refer to the description of the previous paragraph. Details are not described herein again. Multiple candidate uplink shared resources may be determined according to whether the M uplink shared resources are in an idle state. Then, one shared resource that is most suitable for the UE to perform uplink data transmission is determined as the to-be-used uplink shared resource according to channel statuses (which may be specifically modulation and coding schemes) of the multiple candidate uplink shared resources.

Specifically, which manner is used to determine the to-be-used uplink shared resource is not limited in the present invention.

In S301, the embodiments further provide a rule for defining a PRICH. Each uplink shared resource is corresponding to one PRICH. Multiple PRICHs form one PRICH group. PRICHs in a same PRICH group are differentiated by using orthogonal code. Each PRICH is uniquely identified in the following two manners: 1. a group number and orthogonal code; 2. a PHICH group number, orthogonal code, and an offset. A PRICH resource is notified to the UE by using dedicated RRC signaling or in a broadcast form.

S302: The UE transmits uplink data on the to-be-used uplink shared resource.

After determining the to-be-used uplink shared resource, the UE may transmit the uplink data on the to-be-used uplink shared resource.

Figure 4:
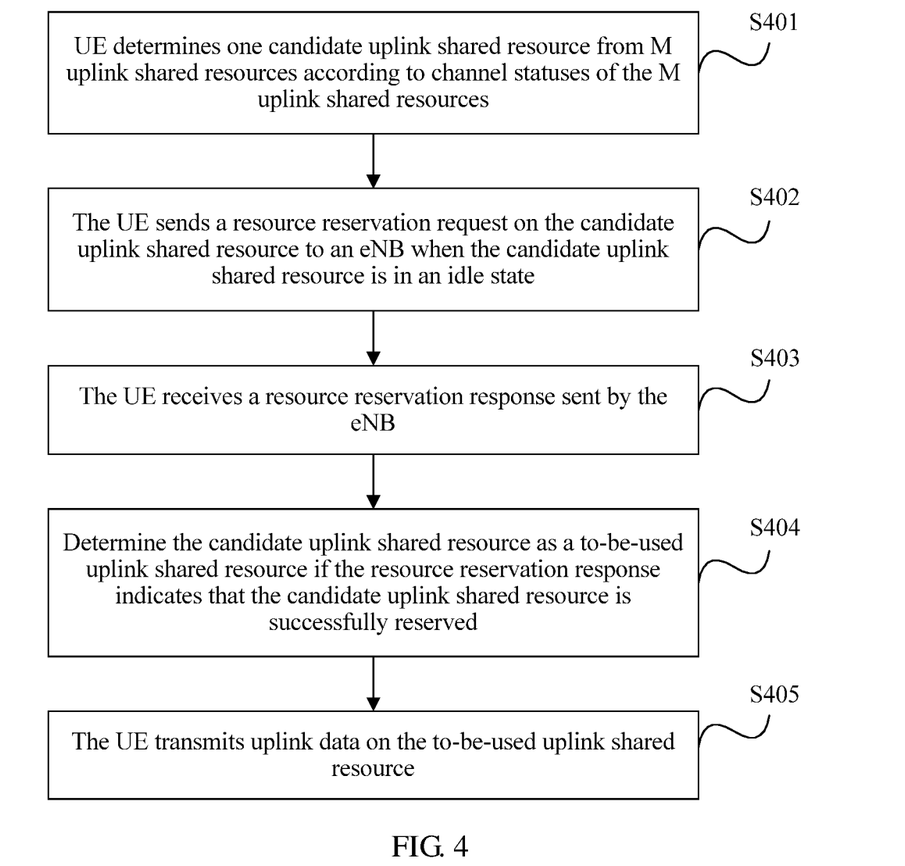
FIG. 4 is a schematic flowchart of Embodiment 4 of a data transmission method.

To avoid a conflict occurred when the UE uses an uplink shared resource, the embodiments further provide a second implementation manner. Specifically, as shown in FIG. 4, FIG. 4 is a schematic flowchart of Embodiment 4 of a data transmission method. The following steps are included.

S401. UE determines one candidate uplink shared resource from M uplink shared resources according to channel statuses of the M uplink shared resources.

For this step, refer to the detailed description of S201. Details are not described herein again.

S402: The UE sends a resource reservation request on the candidate uplink shared resource to an eNB when the candidate uplink shared resource is in an idle state.

The resource reservation request is used to request the eNB to reserve the candidate uplink shared resource for the UE.

For how to determine whether the candidate uplink shared resource is in an idle state, refer to the detailed description of S201. Details are not described herein again.

When the candidate uplink shared resource is in an idle state, a difference between this implementation manner and the first implementation manner lies in that UE sends a resource reservation request on the candidate uplink shared resource to an eNB, so as to request the eNB to reserve, for first UE (for ease of description, the UE that sends the resource reservation request is referred to as the "first UE"), an uplink shared resource (the candidate uplink shared resource) requested by the first UE for reservation. After receiving the resource reservation request sent by the first UE in at least one UE, the eNB determines, according to whether the uplink shared resource requested by the first UE for reservation is in an idle state, whether to reserve the candidate uplink shared resource for the UE, sends a resource reservation response to the first UE, and notifies the UE of a reservation result by using the resource reservation response. The resource reservation response is used to indicate whether the uplink shared resource requested by the first UE for reservation is reserved successfully. If the uplink shared resource requested by the first UE for reservation is reserved, the resource reservation response carries an indication indicating successful reservation. If the uplink shared resource requested by the first UE for reservation is not reserved, the resource reservation response carries an indication indicating failed reservation.

S403: The UE receives a resource reservation response sent by the eNB.

The resource reservation response is used to indicate whether the candidate uplink shared resource requested by the UE for reservation is reserved successfully. The resource reservation response is carried on the PRICHs, and the PRICHs are further used to indicate whether the candidate uplink shared resource requested by the UE for reservation is reserved successfully.

S404: Determine the candidate uplink shared resource as a to-be-used uplink shared resource if the resource reservation response indicates that the candidate uplink shared resource is successfully reserved.

If the eNB reserves the candidate uplink shared resource for the UE, another UE is not allowed to transmit data on the candidate uplink shared resource.

If the resource reservation response indicates that the candidate uplink shared resource fails to be reserved, the UE may back off for a period of time and perform requesting again, or may select another uplink shared resource as the candidate uplink shared resource. The present invention is not limited thereto.

S405: The UE transmits uplink data on the to-be-used uplink shared resource.

Before transmitting the uplink data by using the uplink shared resource, the UE requests the eNB to reserve the to-be-used uplink shared resource. Therefore, when two or more UEs use a same uplink shared resource, a conflict can be avoided.

In the foregoing embodiment, the resource reservation request may be carried in a Media Access Control protocol data unit (MAC PDU) header, or may be carried in a Media Access Control control element (MAC CE), or may be carried in a Msg4 message of an RACH procedure.

For example, the resource reservation request is carried in a MAC PDU header. A data packet format is shown in the following table.

TABLE 1

| RR | R | E | LCID |
|----|---|---|------|
| F  | L |   |      |

"RR" means a resource reservation request; "R" means Reserved, indicating Reserved; "E" means Extension, indicating whether the MAC header includes another field; "LCID" stands for Logical Channel ID, indicating a logical channel ID; "F" means Format, indicating a size of a length field; and "L" means Length, indicating a length of a corresponding MAC SDU or a variable length of a corresponding MAC CE.

In the embodiment shown in FIG. 3 or FIG. 4, if a volume of to-be-transmitted uplink data of the UE is greater than a maximum volume of data that is allowed to be transmitted on the to-be-used uplink shared resource, that is, the to-be-transmitted uplink data needs to be divided into multiple blocks and then transmitted, the UE adds a resource reservation request in an uplink data packet when transmitting the uplink data on the to-be-used uplink shared resource. For example, the UE receives a resource reservation response sent by the eNB, and the resource reservation response indicates that a candidate uplink shared resource is successfully reserved. If a maximum size of a data packet that is allowed to be transmitted on the candidate uplink shared resource each time is 5 M, and a volume of to-be-transmitted data of the UE is 13 M, a resource reservation request is carried in a data packet transmitted for the first time. If a resource reservation response indicates that the resource is successfully reserved, a second block of data is transmitted on the same uplink shared resource. Assuming that a size of the data block transmitted for the first time by the UE is 5 M, a volume of to-be-transmitted data is 8 M, and a resource reservation request is carried in a data packet transmitted for the second time. If a resource reservation response indicates that the resource is successfully reserved, a third block of data is transmitted on the same uplink shared resource. Assuming that a size of the data block transmitted for the second time is 5 M, a volume of to-be-transmitted data is 3 M, less than the maximum size of a data packet that is allowed to be transmitted on the candidate uplink shared resource each time. The third block of data is transmitted on the same uplink shared resource, without a need to carry a resource reservation request. After transmission of the third block of data is complete, a status of the corresponding uplink shared resource is changed to idle. Specifically, a value of a PRICH corresponding to the uplink shared resource is set to idle. A difference lies in the following: In the embodiment shown in FIG. 3, before sending a first piece of uplink data to the eNB, the UE does not send a resource reservation request to the eNB but directly adds, according to an actual situation, a resource reservation request to the first uplink data packet and a subsequent uplink data packet. Specifically, the UE determines, according to a relationship between the volume of to-be-transmitted uplink data of the UE and the maximum volume of data that is allowed to be transmitted on the to-be-used uplink shared resource, whether to carry a resource reservation request. In the embodiment shown in FIG. 4, the UE sends a resource reservation request to the eNB before sending a first uplink data packet to the eNB, and adds a resource reservation request to the first uplink data packet and a subsequent uplink data packet according to an actual situation.

In the foregoing embodiment, the UE may further add a size of a to-be-transmitted data packet of the UE to the resource reservation request transmitted for the first time. Assuming that the size of the to-be-transmitted data packet of the UE is 13 M, the first-time-transmitted resource reservation request of the UE carries the size 13 M of the to-be-transmitted data packet, so that the eNB continuously reserves the uplink shared resource for the UE according to the size, carried in the resource reservation request, of the to-be-transmitted data packet.

In the foregoing embodiment, after the UE transmits the uplink data on the to-be-used uplink shared resource to the eNB, the eNB sends, according to a status of a parsed data packet, an uplink data feedback by using a physical hybrid automatic repeat request indicator channel (PHICH for short). Uplink data feedback information is used to notify the UE whether the eNB successfully receives the uplink data. After receiving the uplink data feedback information sent by the eNB, the UE determines a packet error rate of the uplink data according to the uplink data feedback information. When the packet error rate is greater than a preset threshold, the UE re-determines a to-be-used uplink shared resource to transmit the uplink data, or the UE sends an SR to the eNB to request a dedicated transmission resource to transmit the uplink data. The UE may re-determine a to-be-used uplink shared resource in the following manner: The UE performs transmission on another shared resource, or the UE uses an RACH procedure to send a resource request.

In the foregoing embodiment, when the eNB re-allocates the uplink shared resources or reclaims an allocated uplink shared resource, the eNB sends uplink shared resource update information to the UE. The uplink shared resource update information is used to update the location information of the uplink shared resources. The UE re-determines, according to the uplink shared resource update information, a to-be-used uplink shared resource. For a specific manner, refer to specific descriptions of the foregoing embodiments. Details are not described herein again.

Figure 5:
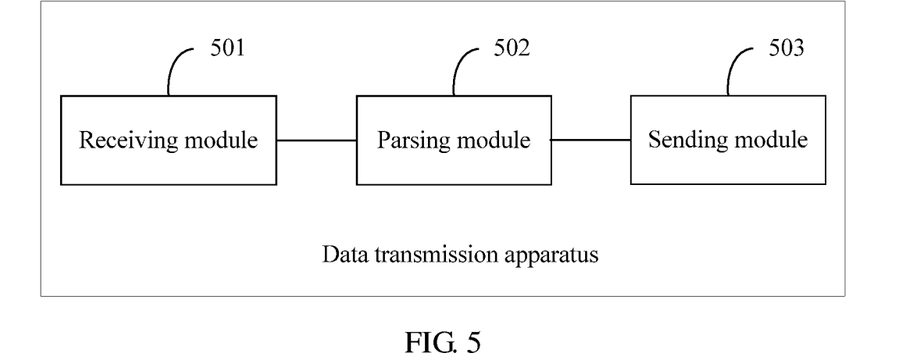
FIG. 5 is a schematic structural diagram of Embodiment 1 of a data transmission apparatus.

FIG. 5 is a schematic structural diagram of Embodiment 1 of a data transmission apparatus. The data transmission apparatus is user equipment UE. The apparatus in this embodiment includes a receiving module 501, a parsing module 502, and a sending module 503. The receiving module 501 is configured to receive uplink shared resource information sent by an evolved NodeB eNB, where the uplink shared resource information includes location information of M uplink shared resources, the M uplink shared resources are uplink shared resources, allocated by the eNB, that the UE is allowed to use without a need to request grant, and M is an integer greater than or equal to 1. The parsing module 502 is configured to parse the uplink shared resource information to obtain the location information. The sending module 503 is configured to transmit uplink data on one of the uplink shared resources corresponding to the location information.

In the foregoing embodiment, the sending module 503 is specifically configured to: determine one to-be-used uplink shared resource in an idle state from the M uplink shared resources, and transmit the uplink data on the to-be-used uplink shared resource.

In the foregoing embodiment, the sending module 503 is specifically configured to: determine one candidate uplink shared resource from the M uplink shared resources according to a status of a channel between the UE and the eNB, and determine the candidate uplink shared resource as the to-be-used uplink shared resource when the candidate uplink shared resource is in an idle state.

In the foregoing embodiment, the uplink shared resource information further includes modulation and coding schemes MCSs respectively corresponding to the M uplink shared resources. The sending module 503 is specifically configured to determine one candidate uplink shared resource from the M uplink shared resources according to the status of the channel between the UE and the eNB and according to the MCSs of the M uplink shared resources.

In the foregoing embodiment, the M uplink shared resources are in a one-to-one correspondence with M physical reservation indication channel PRICHs, and the PRICHs are used to indicate whether the uplink shared resources corresponding to the PRICHs are in an idle state.

The sending module 503 is specifically configured to: determine, according to a PRICH corresponding to the candidate uplink shared resource, whether the candidate uplink shared resource is in an idle state; and determine the candidate uplink shared resource as the to-be-used uplink shared resource when the candidate uplink shared resource is in an idle state.

In the foregoing embodiment, the sending module 503 is specifically configured to: send a resource reservation request on the candidate uplink shared resource to the eNB when the candidate uplink shared resource is in an idle state, where the resource reservation request is used to request the eNB to reserve the candidate uplink shared resource for the UE; receive a resource reservation response sent by the eNB, where the resource reservation response is used to indicate whether the candidate uplink shared resource requested by the UE for reservation is successfully reserved; and determine the candidate uplink shared resource as the to-be-used uplink shared resource if the resource reservation response indicates that the candidate uplink shared resource is successfully reserved.

In the foregoing embodiment, the resource reservation response is carried on the PRICHs, and the PRICHs are further used to indicate whether the candidate uplink shared resource requested by the UE for reservation is successfully reserved.

In the foregoing embodiment, the sending module 503 is specifically configured to: if a volume of to-be-transmitted uplink data of the UE is greater than a maximum volume of data that is allowed to be transmitted on the to-be-used uplink shared resource, transmit the uplink data on the to-be-used uplink shared resource, where the uplink data includes the resource reservation request.

In the foregoing embodiment, the receiving module 501 is further configured to: after the sending module transmits the uplink data on the to-be-used uplink shared resource, receive uplink data feedback information sent by the eNB, where the uplink data feedback information is used to notify the UE whether the eNB successfully receives the uplink data; and determine a packet error rate of the uplink data according to the uplink data feedback information.

The sending module 503 is further configured to: when the packet error rate is greater than a preset threshold, re-determine a to-be-used uplink shared resource to transmit the uplink data, or send a scheduling request SR to the eNB to request a dedicated transmission resource to transmit the uplink data.

In the foregoing embodiment, the receiving module 501 is further configured to: receive uplink shared resource update information sent by the eNB, where the uplink shared resource update information is used to update the location information of the uplink shared resources; and re-determine a to-be-used uplink shared resource according to the uplink shared resource update information.

In the foregoing embodiment, the receiving module 501 is specifically configured to: receive, by using physical layer signaling, the uplink shared resource information sent by the eNB, where the physical layer signaling is scrambled by using a shared RNTI.

The parsing module 502 is specifically configured to: descramble the physical layer signaling by using the shared RNTI to obtain the uplink shared resource information; and parse the uplink shared resource information to obtain the location information.

In the foregoing embodiment, the receiving module 501 is further configured to: before the parsing module descrambles the uplink shared resource information by using the shared RNTI, receive the shared RNTI sent by the eNB.

In the foregoing embodiment, the receiving module 501 is specifically configured to receive, by using dedicated Radio Resource Control RRC protocol signaling, the uplink shared resource information sent by the eNB.

In the foregoing embodiment, the receiving module 501 is specifically configured to receive, by using a system broadcast message, the uplink shared resource information sent by the eNB.

In the foregoing embodiment, the receiving module 501 is specifically configured to receive, by using a Msg4 message, the uplink shared resource information sent by the eNB.

The apparatus in this foregoing embodiment may be correspondingly configured to implement the technical solution in the method embodiment shown in FIG. 1. Implementation principles and technical effects thereof are similar, and details are not described herein again.

Figure 6:
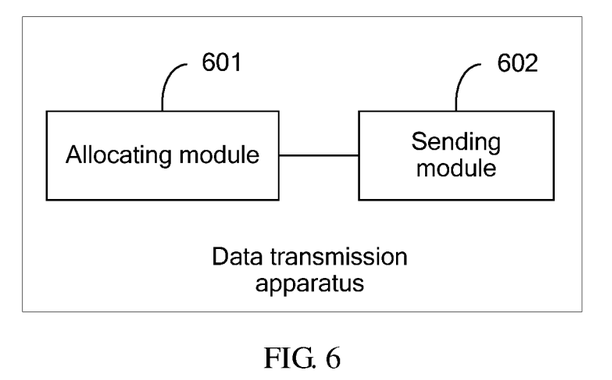
FIG. 6 is a schematic structural diagram of Embodiment 2 of a data transmission apparatus.

FIG. 6 is a schematic structural diagram of Embodiment 2 of a data transmission apparatus. The data transmission apparatus is an evolved NodeB eNB. The apparatus in this embodiment includes an allocating module 601 and a sending module 602. The allocating module 601 is configured to allocate M uplink shared resources to at least one user equipment UE, where the M uplink shared resources are uplink shared resources, allocated by the eNB, that the at least one UE is allowed to use without a need to request grant, and M is an integer greater than or equal to 1. The sending module 602 is configured to send uplink shared resource information to the at least one UE, where the uplink shared resource information includes location information of the M uplink shared resources.

In the foregoing embodiment, the M uplink shared resources are in a one-to-one correspondence with M physical reservation indication channel PRICHs, and the PRICH is used to indicate whether a shared resource corresponding to the PRICH is in an idle state. The sending module 602 is further configured to send resource information of the M PRICHs to the at least one UE after sending the uplink shared resource information to the at least one UE.

In the foregoing embodiment, a receiving module is further included. The receiving module is configured to receive a resource reservation request sent by first UE in the at least one UE, where the resource reservation request is used to request the eNB to reserve, for the first UE, an uplink shared resource requested by the first UE for reservation. The sending module 602 is further configured to send a resource reservation response to the first UE according to whether the uplink shared resource requested by the first UE for reservation is in an idle state, where the resource reservation response is used to indicate whether the uplink shared resource requested by the first UE for reservation is successfully reserved.

In the foregoing embodiment, the resource reservation response is carried on the PRICHs, and the PRICHs are further used to indicate whether the candidate uplink shared resource requested by the UE for reservation is successfully reserved.

In the foregoing embodiment, the sending module 602 is further configured to send uplink shared resource update information to the at least one UE.

In the foregoing embodiment, the sending module 602 is specifically configured to: scramble physical layer signaling by using a shared RNTI; and send the uplink shared resource information to the at least one UE by using the physical layer signaling.

In the foregoing embodiment, the sending module 602 is further configured to send the shared RNTI to the at least one UE before scrambling the uplink shared resource information by using the shared RNTI.

In the foregoing embodiment, the sending module 602 is specifically configured to send the uplink shared resource information to the at least one UE by using dedicated Radio Resource Control RRC protocol signaling.

In the foregoing embodiment, the sending module 602 is specifically configured to send the uplink shared resource information to the at least one UE by using a Msg4 message.

The apparatus in this foregoing embodiment may be correspondingly configured to implement the technical solution in the method embodiment shown in FIG. 2. Implementation principles and technical effects thereof are similar, and details are not described herein again.

Figure 7:
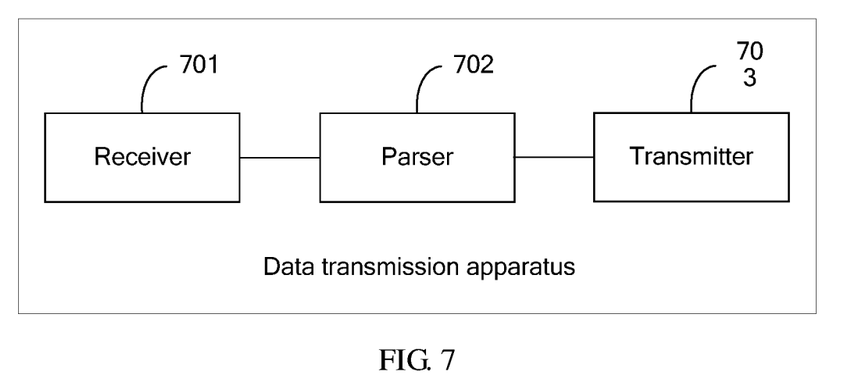
FIG. 7 is a schematic structural diagram of Embodiment 3 of a data transmission apparatus.

FIG. 7 is a schematic structural diagram of Embodiment 3 of a data transmission apparatus. As shown in FIG. 7, the data transmission apparatus is user equipment UE. The apparatus in this embodiment includes a receiver 701, a parser 702, and a transmitter 703. The receiver 701 is configured to receive uplink shared resource information sent by an evolved NodeB eNB, where the uplink shared resource information includes location information of M uplink shared resources, the M uplink shared resources are uplink shared resources, allocated by the eNB, that the UE is allowed to use without a need to request grant, and M is an integer greater than or equal to 1. The parser 702 is configured to parse the uplink shared resource information to obtain the location information. The transmitter 703 is configured to transmit uplink data on one of the uplink shared resources corresponding to the location information.

In the foregoing embodiment, the transmitter 703 is specifically configured to: determine one to-be-used uplink shared resource in an idle state from the M uplink shared resources, and transmit the uplink data on the to-be-used uplink shared resource.

In the foregoing embodiment, the transmitter 703 is specifically configured to: determine one candidate uplink shared resource from the M uplink shared resources according to a status of a channel between the UE and the eNB, and determine the candidate uplink shared resource as the to-be-used uplink shared resource when the candidate uplink shared resource is in an idle state.

In the foregoing embodiment, the uplink shared resource information further includes modulation and coding schemes MCSs respectively corresponding to the M uplink shared resources. The transmitter 703 is specifically configured to determine one candidate uplink shared resource from the M uplink shared resources according to the status of the channel between the UE and the eNB and according to the MCSs of the M uplink shared resources.

In the foregoing embodiment, the M uplink shared resources are in a one-to-one correspondence with M physical reservation indication channel PRICHs, and the PRICHs are used to indicate whether the uplink shared resources corresponding to the PRICHs are in an idle state. The transmitter 703 is specifically configured to: determine, according to a PRICH corresponding to the candidate uplink shared resource, whether the candidate uplink shared resource is in an idle state; and determine the candidate uplink shared resource as the to-be-used uplink shared resource when the candidate uplink shared resource is in an idle state.

In the foregoing embodiment, the transmitter 703 is specifically configured to: send a resource reservation request on the candidate uplink shared resource to the eNB when the candidate uplink shared resource is in an idle state, where the resource reservation request is used to request the eNB to reserve the candidate uplink shared resource for the UE; receive a resource reservation response sent by the eNB, where the resource reservation response is used to indicate whether the candidate uplink shared resource requested by the UE for reservation is successfully reserved; and determine the candidate uplink shared resource as the to-be-used uplink shared resource if the resource reservation response indicates that the candidate uplink shared resource is successfully reserved.

In the foregoing embodiment, the resource reservation response is carried on the PRICHs, and the PRICHs are further used to indicate whether the candidate uplink shared resource requested by the UE for reservation is successfully reserved.

In the foregoing embodiment, the transmitter 703 is specifically configured to: if a volume of to-be-transmitted uplink data of the UE is greater than a maximum volume of data that is allowed to be transmitted on the to-be-used uplink shared resource, transmit the uplink data on the to-be-used uplink shared resource, where the uplink data includes the resource reservation request.

In the foregoing embodiment, the receiver 701 is further configured to: after the transmitter transmits the uplink data on the to-be-used uplink shared resource, receive uplink data feedback information sent by the eNB, where the uplink data feedback information is used to notify the UE whether the eNB successfully receives the uplink data; and determine a packet error rate of the uplink data according to the uplink data feedback information. The transmitter 703 is further configured to: when the packet error rate is greater than a preset threshold, re-determine a to-be-used uplink shared resource to transmit the uplink data, or send a scheduling request SR to the eNB to request a dedicated transmission resource to transmit the uplink data.

In the foregoing embodiment, the receiver 701 is further configured to: receive uplink shared resource update information sent by the eNB, where the uplink shared resource update information is used to update the location information of the uplink shared resources; and re-determine a to-be-used uplink shared resource according to the uplink shared resource update information.

In the foregoing embodiment, the receiver 701 is specifically configured to: receive, by using physical layer signaling, the uplink shared resource information sent by the eNB, where the physical layer signaling is scrambled by using a shared RNTI.

The parser is specifically configured to: descramble the physical layer signaling by using the shared RNTI to obtain the uplink shared resource information; and parse the uplink shared resource information to obtain the location information.

In the foregoing embodiment, the receiver 701 is further configured to: before the parser descrambles the uplink shared resource information by using the shared RNTI, receive the shared RNTI sent by the eNB.

In the foregoing embodiment, the receiver 701 is specifically configured to receive, by using dedicated Radio Resource Control RRC protocol signaling, the uplink shared resource information sent by the eNB.

In the foregoing embodiment, the receiver 701 is specifically configured to receive, by using a system broadcast message, the uplink shared resource information sent by the eNB.

In the foregoing embodiment, the receiver 701 is specifically configured to receive, by using a Msg4 message, the uplink shared resource information sent by the eNB.

The apparatus in this foregoing embodiment may be correspondingly configured to implement the technical solution in the method embodiment shown in FIG. 1. Implementation principles and technical effects thereof are similar, and details are not described herein again.

Figure 8:
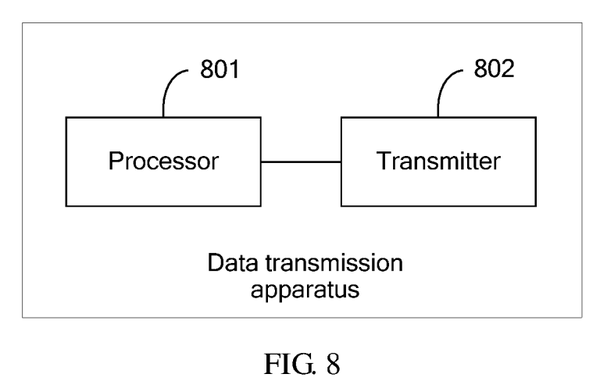
FIG. 8 is a schematic structural diagram of Embodiment 4 of a data transmission apparatus.

FIG. 8 is a schematic structural diagram of Embodiment 4 of a data transmission apparatus. The data transmission apparatus is an evolved NodeB eNB. As shown in FIG. 8, the apparatus in this embodiment includes a processor 801 and a transmitter 802. The processor 801 is configured to allocate M uplink shared resources to at least one user equipment UE, where the M uplink shared resources are uplink shared resources, allocated by the eNB, that the at least one UE is allowed to use without a need to request grant, and M is an integer greater than or equal to 1. The transmitter 802 is configured to send uplink shared resource information to the at least one UE, where the uplink shared resource information includes location information of the M uplink shared resources.

In the foregoing embodiment, the M uplink shared resources are in a one-to-one correspondence with M physical reservation indication channel PRICHs, and the PRICH is used to indicate whether a shared resource corresponding to the PRICH is in an idle state. The transmitter 802 is further configured to send resource information of the M PRICHs to the at least one UE after sending the uplink shared resource information to the at least one UE.

In the foregoing embodiment, a receiver is further included, and configured to receive a resource reservation request sent by first UE in the at least one UE, where the resource reservation request is used to request the eNB to reserve, for the first UE, an uplink shared resource requested by the first UE for reservation. The transmitter 802 is further configured to send a resource reservation response to the first UE according to whether the uplink shared resource requested by the first UE for reservation is in an idle state, where the resource reservation response is used to indicate whether the uplink shared resource requested by the first UE for reservation is successfully reserved.

In the foregoing embodiment, the resource reservation response is carried on the PRICHs, and the PRICHs are further used to indicate whether the candidate uplink shared resource requested by the UE for reservation is successfully reserved.

In the foregoing embodiment, the transmitter 802 is further configured to send uplink shared resource update information to the at least one UE.

In the foregoing embodiment, the transmitter 802 is specifically configured to: scramble physical layer signaling by using a shared RNTI; and send the uplink shared resource information to the at least one UE by using the physical layer signaling.

In the foregoing embodiment, the transmitter 802 is further configured to send the shared RNTI to the at least one UE before scrambling the uplink shared resource information by using the shared RNTI.

In the foregoing embodiment, the transmitter 802 is specifically configured to send the uplink shared resource information to the at least one UE by using dedicated Radio Resource Control RRC protocol signaling.

In the foregoing embodiment, the transmitter 802 is specifically configured to send the uplink shared resource information to the at least one UE by using a Msg4 message.

The apparatus in this foregoing embodiment may be correspondingly configured to implement the technical solution in the method embodiment shown in FIG. 2. Implementation principles and technical effects thereof are similar, and details are not described herein again.

In the several embodiments provided, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   pre-allocating, by an evolved NodeB (eNB), M uplink shared resources to a user equipment (UE) that is within a preset area, according to a preset rule, wherein the M uplink shared resources are uplink shared resources that the UE is allowed to use without needing to request a grant of uplink shared resources from the eNB, and wherein M is an integer greater than or equal to 1; and
   sending, by the eNB, uplink shared resource information to the UE, wherein the uplink shared resource information comprises location information of the M uplink shared resources that are pre-allocated to the UE.

2. The method according to claim 1, wherein the M uplink shared resources are in a one-to-one correspondence with M physical reservation indication channels (PRICHs), and each of the M PRICHs indicates whether an uplink shared resource corresponding to the PRICH is in an idle state; and
   wherein after sending the uplink shared resource information to the UE, the method further comprises sending, by the eNB, resource information of the M PRICHs to the UE.

3. The method according to claim 2, further comprising:
   receiving, by the eNB, a resource reservation request sent by the UE, wherein the resource reservation request requests the eNB to reserve, for the UE, an uplink shared resource requested by the UE; and
   sending, by the eNB, a resource reservation response to the UE according to whether the uplink shared resource requested by the UE for reservation is in an idle state, wherein the resource reservation response indicates whether the uplink shared resource requested by the UE for reservation is successfully reserved.

4. The method according to claim 3, wherein the resource reservation response is carried on the M PRICHs, and the M PRICHs further indicate whether the uplink shared resource requested by the UE for reservation is successfully reserved.

5. The method according to claim 1, further comprising:
   sending, by the eNB, uplink shared resource update information to the UE.

6. The method according to claim 1, wherein sending, by the eNB, uplink shared resource information to the UE comprises:
   scrambling, by the eNB, physical layer signaling using a shared radio network temporary identifier (a shared RNTI); and
   sending, by the eNB, the uplink shared resource information to the UE by using the physical layer signaling.

7. A User Equipment (UE), comprising:
   a receiver, configured to receive uplink shared resource information sent by an evolved NodeB (eNB), wherein the uplink shared resource information comprises location information of M uplink shared resources, wherein the M uplink shared resources are uplink shared resources that have been pre-allocated by the eNB to the UE, according to the UE being within a preset area and according to a preset rule, and that the UE is allowed to use without needing to request a grant of uplink shared resources from the eNB, and wherein M is an integer greater than or equal to 1;

a processor, configured to parse the uplink shared resource information to obtain the location information; and a transmitter, configured to transmit uplink data on one of the uplink shared resources corresponding to the location information of the M uplink shared resources that have been pre-allocated to the UE.

8. The UE according to claim 7, wherein the transmitter is further configured to:

determine one to-be-used uplink shared resource in an idle state from the M uplink shared resources, and transmit the uplink data on the to-be-used uplink shared resource.

9. The UE according to claim 8, wherein the transmitter is further configured to:

determine a candidate uplink shared resource from the M uplink shared resources according to a status of a channel between the UE and the eNB, and determine the candidate uplink shared resource as the to-be-used uplink shared resource when the candidate uplink shared resource is in an idle state.

10. The UE according to claim 9, wherein the M uplink shared resources are in a one-to-one correspondence with M physical reservation indication channels (PRICH), and the PRICHs indicate whether the uplink shared resources corresponding to the PRICHs are in an idle state; and wherein the transmitter is further configured to: determine, according to a PRICH corresponding to the candidate uplink shared resource, whether the candidate uplink shared resource is in an idle state; and determine the candidate uplink shared resource as the to-be-used uplink shared resource when the candidate uplink shared resource is in an idle state.

11. The UE according to claim 10, wherein the transmitter is further configured to:

send a resource reservation request on the candidate uplink shared resource to the eNB when the candidate uplink shared resource is in an idle state, wherein the resource reservation request requests the eNB to reserve the candidate uplink shared resource for the UE;

receive a resource reservation response sent by the eNB, wherein the resource reservation response indicates whether the candidate uplink shared resource requested by the UE for reservation is successfully reserved; and determine the candidate uplink shared resource as the to-be-used uplink shared resource when the resource reservation response indicates that the candidate uplink shared resource is successfully reserved.

12. The UE according to claim 11, wherein the resource reservation response is carried on the PRICHs, and the PRICHs further indicate whether the candidate uplink shared resource requested by the UE for reservation is successfully reserved.

13. The UE according to claim 7, wherein the receiver is further configured to:

receive uplink shared resource update information sent by the eNB, wherein the uplink shared resource update information is used to update the location information of the uplink shared resources; and re-determine a to-be-used uplink shared resource according to the uplink shared resource update information.

14. An evolved NodeB (eNB), comprising:

a processor, configured to pre-allocate M uplink shared resources to a user equipment (UE) that is within a preset area, according to a preset rule, wherein the M uplink shared resources are uplink shared resources that the UE is allowed to use without needing to request a grant of uplink shared resources from the eNB, and wherein M is an integer greater than or equal to 1; and a transmitter, configured to send uplink shared resource information to the UE, wherein the uplink shared resource information comprises location information of the M uplink shared resources that are pre-allocated to the UE.

15. The eNB according to claim 14, wherein the M uplink shared resources are in a one-to-one correspondence with M physical reservation indication channels (PRICHs), and each of the PRICHs indicates whether an uplink shared resource corresponding to the PRICH is in an idle state; and the transmitter is further configured to send resource information of the M PRICHs to the UE after sending the uplink shared resource information to the UE.

16. The eNB according to claim 15, further comprising:

a receiver, configured to receive a resource reservation request sent by the UE, wherein the resource reservation request requests the eNB to reserve, for the UE, an uplink shared resource requested by the UE for reservation;

wherein the transmitter is further configured to send a resource reservation response to the UE according to whether the uplink shared resource requested by the UE for reservation is in an idle state, wherein the resource reservation response indicates whether the uplink shared resource requested by the UE for reservation is successfully reserved.

17. The eNB according to claim 16, wherein the resource reservation response is carried on the M PRICHs, and the M PRICHs indicate whether the uplink shared resource requested by the UE for reservation is successfully reserved.

18. The eNB according to claim 14, wherein the transmitter is further configured to send uplink shared resource update information to the UE.

19. The eNB according to claim 14, wherein the transmitter is further configured to: scramble physical layer signaling by using a shared radio network temporary identifier (a shared RNTI); and send the uplink shared resource information to the UE using the physical layer signaling.

20. The eNB according to claim 19, wherein the transmitter is further configured to send the shared RNTI to the UE before scrambling the uplink shared resource information by using the shared RNTI.

21. The method according to claim 1, wherein pre-allocating M uplink shared resources to the UE that is within the preset area, according to a preset rule comprises determining M uplink shared resources for pre-allocation according to a service type of the UE.

* * * * *